United States Patent
Carbone et al.

(10) Patent No.: US 6,181,489 B1
(45) Date of Patent: Jan. 30, 2001

(54) COMBINATION LENS AND WINDOW RETAINER AND HOUSING ASSEMBLY FOR A MOTION DETECTOR SYSTEM

(75) Inventors: Chris A. Carbone; John R. Baldwin, both of Newtown, CT (US)

(73) Assignee: Hubbell Incorporated, Orange, CT (US)

( * ) Notice: Under 35 U.S.C. 154(b), the term of this patent shall be extended for 0 days.

(21) Appl. No.: 09/192,472

(22) Filed: Nov. 16, 1998

(51) Int. Cl.$^7$ .............................. G02B 7/02; G02B 13/18; G01J 5/02
(52) U.S. Cl. .......................... 359/811; 359/808; 250/353; 340/567
(58) Field of Search ..................................... 359/808, 811, 359/819, 513; 250/353, 339.14; 340/567

(56) References Cited

U.S. PATENT DOCUMENTS

| | | | |
|---|---|---|---|
| 2,435,908 | * | 2/1948 | Tinnerman ............................ 359/819 |
| 4,447,726 | * | 5/1984 | Mudge et al. ........................ 250/342 |
| 5,626,417 | * | 5/1997 | McCavit ................................ 250/353 |
| 5,662,411 | * | 9/1997 | Haslam et al. ........................ 250/353 |

* cited by examiner

*Primary Examiner*—Cassandra Spyrou
*Assistant Examiner*—Jared Treas

(74) *Attorney, Agent, or Firm*—Jerry M. Presson; Michael R. Swartz

(57) ABSTRACT

A housing assembly includes a combination lens and window retainer, an inner optical lens, an outer optical window and a front cover. The retainer includes a middle body structure, a pair of side wing structures, an inner seat and an outer seat. The middle body structure has opposite lateral sides, interior portions and exterior portions. The side wing structures are attached to and extend in opposite lateral directions from the opposite lateral sides of the middle body structure. Each side wing structure has exterior portions. The inner seat is defined on the interior portions of the middle body structure. The outer seat is defined forwardly of the inner seat on the exterior portions of the middle body structure and of the side wing structures. The inner optical lens is mounted to the inner seat of the retainer. The middle body structure and side wing structures together define an opening aligned with the inner optical lens and provides an unobstructed forward panoramic field of view through the retainer. The outer optical window is sandwiched between the front cover and the retainer and disposed in an overlying relationship to the opening of the retainer. The front cover houses the retainer, the inner optical lens and the outer optical window. The front cover is coupled with the outer optical window and the retainer and defines a window aligned with the outer optical window and the opening of the retainer and provides an unobstructed forward panoramic field of view through the front cover substantially corresponding with the unobstructed forward panoramic field of view through the retainer.

20 Claims, 3 Drawing Sheets

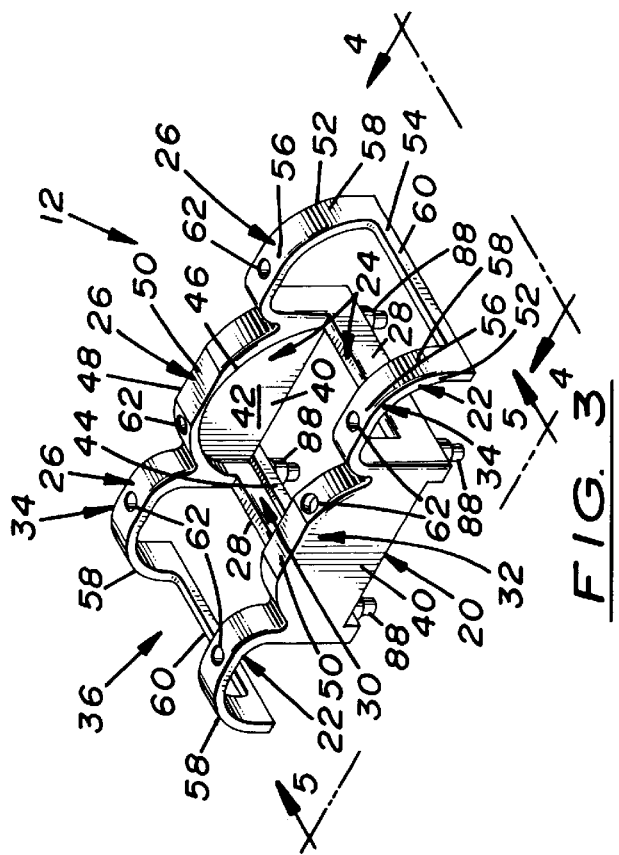
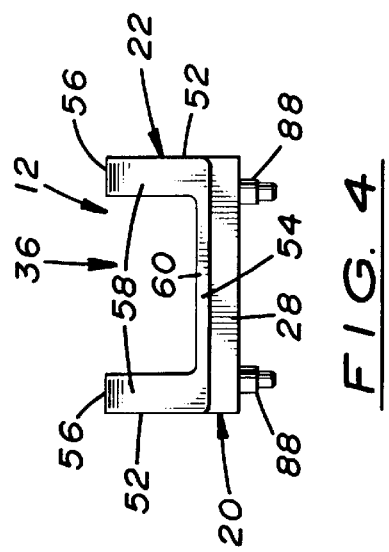
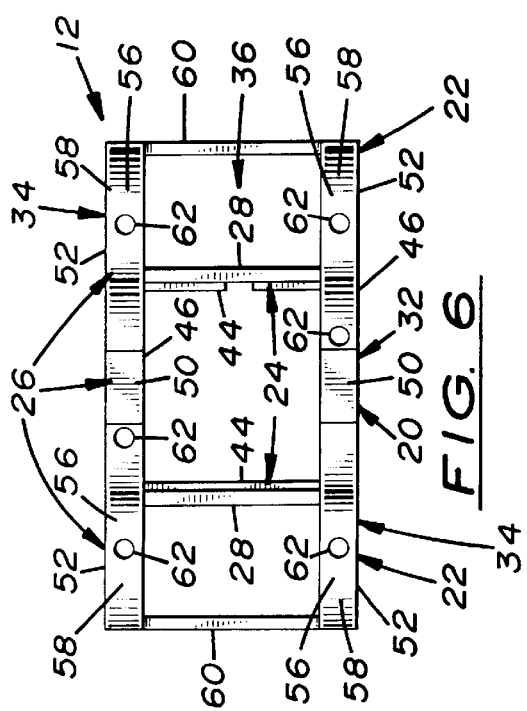
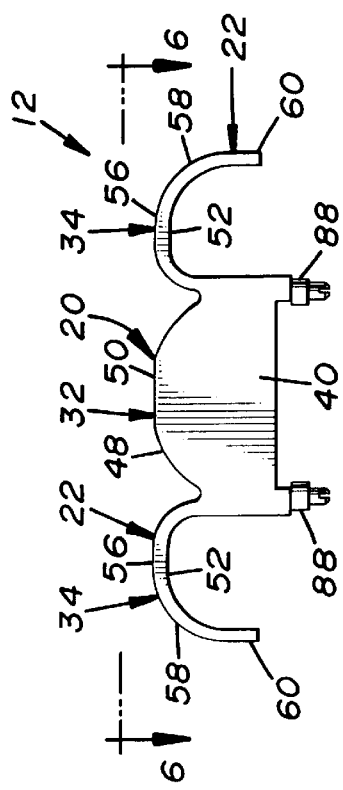

COMBINATION LENS AND WINDOW RETAINER AND HOUSING ASSEMBLY FOR A MOTION DETECTOR SYSTEM

BACKGROUND OF THE INVENTION

1. Field of the Invention

The present invention generally relates to a wall mounted motion detection system and, more particularly, is concerned with a combination lens and window housing assembly for a motion detection system and a combination lens and window retainer employed therein for supporting both an optical lens and an optical window in a desired arrangement.

2. Description of the Prior Art

A passive infrared motion detection system detects heat energy radiated or emitted by an object, such as a body of a person, moving across a field of view of a heat sensor, such as a pyroelectric detector, of the motion detection system. The motion detection system must be capable of distinguishing between background temperature and a temperature of the moving object which is different from that of the background. Thus, the detection system has an electrical circuit operatively coupled to the heat sensor for producing a detection signal in response to the heat sensor detecting a change of temperature as, for example, caused by the body heat of a person entering the detection pattern.

The sensitive area of the heat sensor is too small to detect a significant amount of heat energy radiated from a human body by using the heat sensor alone. Thus, the detection system typically employs a lens made up of an array of Fresnel lens segments in a configuration for collecting and focusing a significantly greater amount of heat energy on the heat sensor than would be received using the heat sensor alone. A Fresnel lens segment is most efficient when it is flat. However, typically a lens array of Fresnel lens segments must be provided in a curved configuration in order to collect and focus the desired amount of heat energy on the heat sensor from a wide angle detection pattern. Thus, the lens array of Fresnel lens segments approximate this flatness by being provided as close-to-flat vertical segments arranged in a contiguous side-by-side relationship along a curve of constant radius.

One particular motion detection system is a low profile wide field of view optical system that employs an optical window in front of the Fresnel optical lens. The optical window has a relatively large flat main portion with opposite curved end portions. The Fresnel optical lens has the aforementioned curved configuration. A need exists for a structure to mount and enclose both the optical window lens and Fresnel optical lens in the desired arrangement.

SUMMARY OF THE INVENTION

The present invention provides a combination lens and window retainer and housing assembly designed to satisfy the aforementioned need. The combination lens and window retainer of the present invention employed in the housing assembly is a single unitary structure. The structure defines interior and exterior seats. The interior seat is adapted to retain and support an inner optical lens about peripheral edges of the inner optical lens and without obstructing the field of view of the inner optical lens. The exterior seat is located forwardly and outwardly of the interior seat and adapted to retain and support an outer optical window about peripheral edges of the outer optical window and without obstructing the field of view of the outer optical window. The outer optical window is supported in a desired position forwardly and outwardly of the inner optical lens such that the outer optical window extends across the field of view of the inner optical lens.

Accordingly, the present invention is directed to a combination lens and window retainer for a motion detection system. The combination lens and window retainer comprises: (a) a middle body structure having opposite lateral sides, interior portions and exterior portions; (b) a pair of side wing structures attached to and extending in opposite directions from the opposite lateral sides of the middle body structure, each of the side wing structures having exterior portions; (c) an inner seat defined on the interior portions of the middle body structure for receiving and supporting an inner optical lens, the middle body structure and side wing structures together defining an opening aligned with the inner optical lens and providing an unobstructed forward panoramic field of view through the retainer; and (d) an outer seat defined forwardly of the inner seat on the exterior portions of the middle body structure and of the side wing structures for receiving and supporting an outer optical window in an overlying relationship to the opening of the middle body structure and side wing structures.

More particularly, the middle body structure has a configuration which substantially conforms to the configuration of the inner optical lens. The middle body structure also has a pair of opposite end walls. The interior portions of the middle body structure include a pair of opposite interior surfaces each on one of the opposite end walls of the middle body structure, a pair of opposite side ledges each formed on one of the opposite lateral sides of the middle body structure and extending between the opposite end walls and toward the other of the opposite lateral sides thereof, and a pair of opposite end ledges each formed on one of the opposite end walls at a forward peripheral edge thereof and extending toward the other of the opposite end walls. The inner seat is formed by the opposite side ledges, opposite end wall interior surfaces and opposite end ledges of the interior portions of the middle body structure. Each of the opposite side ledges of the interior portions forming the inner seat has a substantially straight configuration adapted to receive and support one of a pair of substantially straight side edges of the inner optical lens. Each of the opposite end ledges of the interior portions forming the inner seat has a substantially curved configuration and, in combination with an adjacent one of the opposite end wall interior surfaces of the interior portions forming the inner seat, is adapted to receive and support one of a pair of substantially curved end edges of the inner optical lens.

The exterior portions of the middle body structure include a pair of exterior flat surfaces each formed along a peripheral edge of a respective one of the opposite end walls. Each of the side wing structures has a pair of opposite end rims and a lateral side rim extending between and connected to the opposite end rims and spaced away from a respective one of the opposite lateral sides of the middle body structure. The exterior portions of each of the side wing structures include a pair of exterior flat surfaces each formed along one of the opposite end rims and disposed in the same plane as the flat surfaces of the exterior portions formed along the peripheral edges of the opposite end walls of the middle body structure, a pair of opposite exterior curved surfaces each formed along one of the opposite end rims and extending from the exterior flat surfaces on the opposite end rims, and an exterior straight surface formed along the lateral side rim and extending between the opposite exterior curved surfaces. The outer seat is formed by the exterior flat surfaces of the exterior portions of the middle body structure and of the side wing structures and by the exterior curved and straight surfaces of the exterior portions of the side wing structures.

Also, the middle body structure and side wing structures define a plurality of apertures through the opposite end wall peripheral edges of the middle body structure and the opposite end rims of the side wing structures on opposite sides of the opening therethrough. Each of the apertures and aligned holes are for receiving one of a plurality of couplers therethrough for coupling the outer optical window lens to the middle body structure and side wing structures. Each opposite lateral side of the middle body structure has a pair of spaced apart protrusions formed thereon rearwardly of the inner seat for contacting a support substrate and spacing the middle body structure away therefrom.

The present invention is also directed to a combination lens and window housing assembly for a motion detection system. The combination lens and window housing assembly comprises: (a) the combination lens and window retainer as defined above; (b) an inner optical lens mounted to the inner seat of the retainer; (c) an outer optical window lens mounted to the outer seat of the retainer; and (d) a front cover housing the retainer, the inner optical lens and the outer optical window and coupled with the outer optical window and the retainer, the front cover defining a window aligned with the outer optical window and the opening of the retainer and providing an unobstructed forward panoramic field of view through the front cover substantially corresponding with the unobstructed forward panoramic field of view through the combination lens and window retainer.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is an enlarged perspective view of the combination lens and window retainer.

FIG. 4 is an end elevational view of the retainer as seen along line 4—4 of FIG. 3.

FIG. 5 is a side elevational view of the retainer as seen along line 5—5 of FIG. 3.

FIG. 6 is a top plan view of the retainer as seen along line 6—6 of FIG. 5.

DETAILED DESCRIPTION OF THE INVENTION

Figure 1:
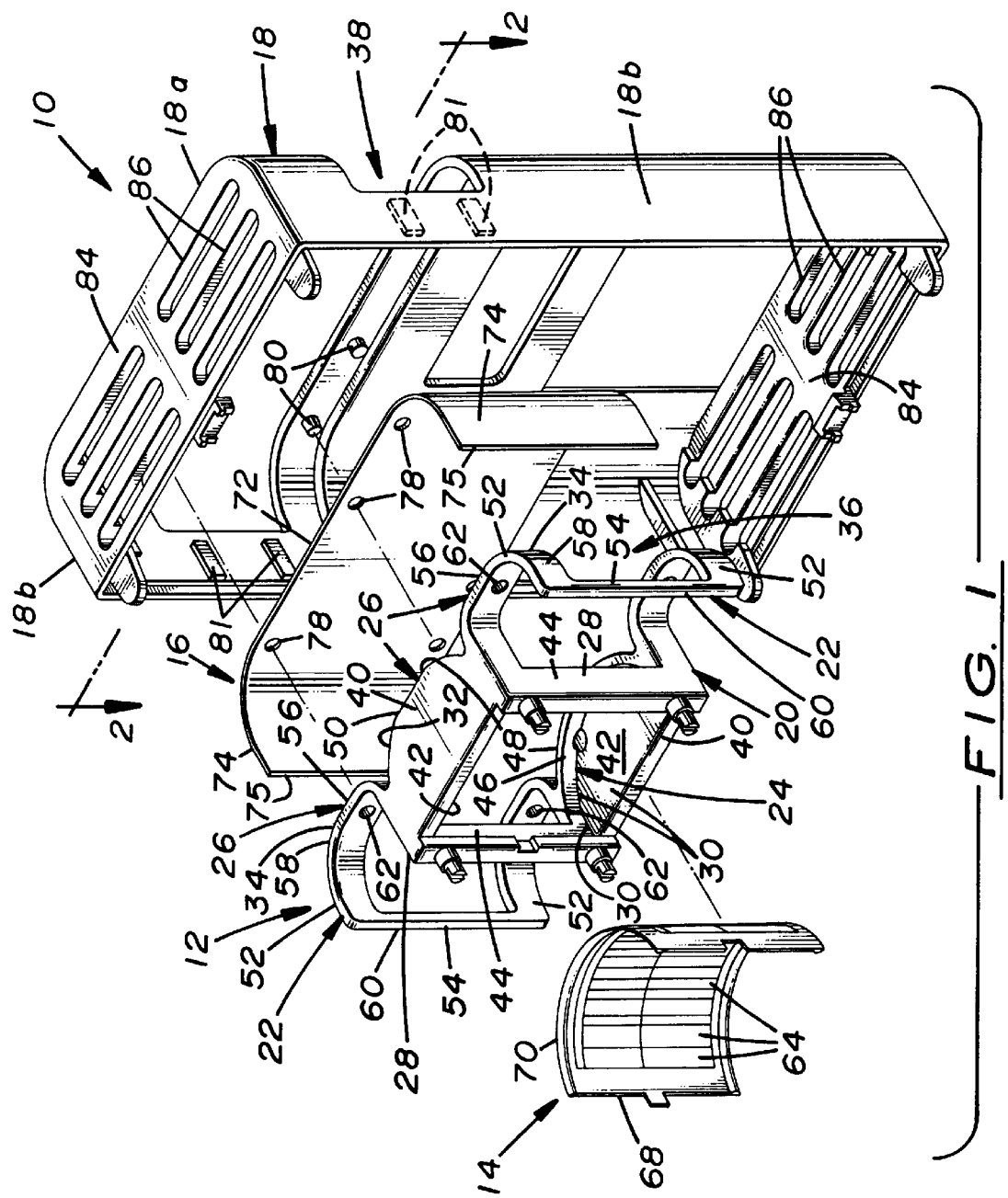
FIG. 1 is an exploded perspective view of a combination lens and window housing assembly of the present invention for a motion detection system employing a combination lens and window retainer of the present invention.

In the following description, like reference characters designate like or corresponding parts throughout the several views of the drawings. Also in the following description, it is to be understood that such terms as "forward", "frearward", "left", "right", "upwardly", "downwardly", and the like are words of convenience and are not to be construed as limiting terms.

Figure 2:
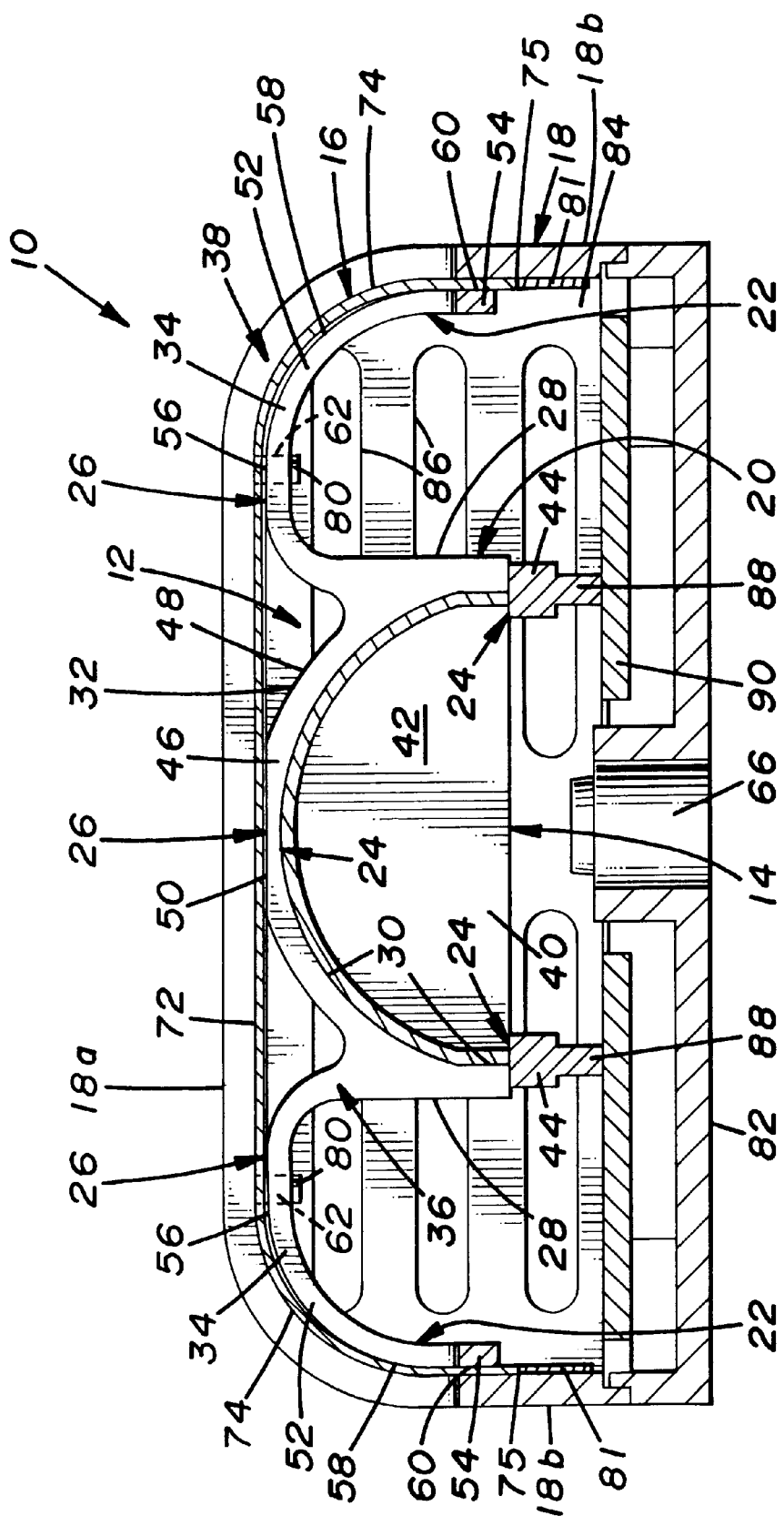
FIG. 2 is an enlarged cross-sectional view of the housing assembly in assembled form taken along line 2—2 of FIG. 1.

Referring to the drawings and particularly to FIGS. 1 and 2, there is illustrated a combination lens and window retainer housing assembly of the present invention, generally designated 10, for use in a motion detection system. The dual lens housing assembly 10 basically includes a combination lens and window retainer 12 also of the present invention, an inner optical lens 14, an outer optical window 16 and a front cover 18.

The combination lens and window retainer 12 includes a middle body structure 20, a pair of side wing structures 22, an inner seat 24 and an outer seat 26. The middle body structure 20 has opposite lateral sides 28, interior portions 30 and exterior portions 32. The side wing structures 22 are attached to and extend in opposite lateral directions from the opposite lateral sides 28 of the middle body structure 20. Each side wing structure 22 has exterior portions 34. The inner seat 24 is defined on the interior portions 30 of the middle body structure 20. The outer seat 26 is defined forwardly of the inner seat 24 on the exterior portions 32, 34 of the middle body structure 20 and the side wing structures 22. The inner optical lens 14 is mounted to the inner seat 24 of the retainer 12. The middle body structure 20 and side wing structures 22 of the retainer 12 together define an opening 36 aligned with the inner optical lens 14 and providing an unobstructed forward panoramic field of view through the retainer 12. The outer optical window 16 is sandwiched between the retainer 12 and the front cover 18 and overlies the opening 36 of the retainer 12. The front cover 18 encloses or houses the retainer 12, the inner optical lens 14 and the outer optical window 16 and is coupled to the outer optical window 16 and the retainer 12. Also, the front cover 18 defines a window 38 aligned with the outer optical window 16 and the opening 36 of the retainer 12 and provides an unobstructed forward panoramic field of view through the front cover 18 substantially corresponding with the unobstructed forward panoramic field of view through the combination lens and window retainer 12. The opening 36 and window 38 have respective configurations substantially the same as the configuration of the outer optical window 16.

Referring now to FIGS. 1 to 6, the middle body structure 20 of the retainer 12 has an overall configuration which substantially conforms to the overall configuration of the inner optical lens 14. The middle body structure 20 also has a pair of opposite end walls 40. The interior portions 30 of the middle body structure 20 include a pair of opposite interior surfaces 42, a pair of opposite lateral side ledges 44 and a pair of opposite end ledges 46. Each interior surface 42 is formed on one of the opposite end walls 40. Each lateral side ledge 44 is formed on one of the opposite lateral sides 28 and extends between the opposite end walls 40 and toward the other of the opposite lateral sides 28. Each end ledge 46 is formed on one of the opposite end walls 40 at a forward peripheral edge 48 thereof and extends toward the other of the opposite end walls 40. The inner seat 24 is formed by the opposite lateral side ledges 44, opposite end wall interior surfaces 42 and opposite end ledges 46 of the interior portions 30 of the middle body structure 20. Each of the opposite lateral side ledges 44 of the interior portions 30 forming the inner seat 25 has a substantially straight configuration. Each of the opposite end ledges 46 of the interior portions 30 forming the inner seat 24 has a substantially curved configuration.

The exterior portions 32 of the middle body structure 20 include a pair of exterior flat surfaces 50 each formed along the peripheral edge 48 of a respective one of the opposite end walls 40 of the middle body structure 20. Each of the side wing structures 22 has a pair of opposite end rims 52 and a lateral side rim 54 extending between and connected to the opposite end rims 52 and spaced away from a respective one of the opposite lateral sides 28 of the middle body structure 20. The exterior portions 34 of each of the side wing structures 22 include a pair of exterior flat surfaces 56, a pair of opposite exterior curved surfaces 58 and an exterior straight surface 60. Each exterior flat surface 56 of the exterior portions 32 of the side wing structures 22 is formed along one of the opposite end rims 52 thereof and disposed in the same plane as the exterior flat surfaces 50 of the exterior portions 32 of the opposite end walls 40 of the middle body structure 20. Each exterior curved surface 58 of the exterior portions 32 of a respective one of the side wing structures 22 is formed along one of the opposite end rims 52 thereof and extends away from the exterior flat surfaces 56 on the opposite end rims 52. Each exterior straight surface 60 of the exterior portions 32 of a respective one of the side wing structures 22 is formed along the lateral side rim 54 and extends between the opposite exterior curved surfaces 58. The outer seat 26 is formed by the exterior flat surfaces 50, 56 of the exterior portions 32,34 of the middle body structure 20 and of the side wing structures 22 and by the exterior curved and straight surfaces 58,60 of the exterior portions 34 of the side wing structures 22. Each side wing structure 22 has an overall configuration generally similar to that of the middle body structure 20. However, each side wing structure 22 has a size somewhat smaller than the size of the middle body structure 20. Also, the middle body structure 20 and side wing structures 22 define a plurality of spaced apart apertures 62 through the opposite end wall peripheral edges 48 of the middle body structure 20 and the opposite end rims 52 of the side wing structures 22 on the opposite sides of the opening 36 therethrough.

Referring again to FIGS. 1 and 2, the inner optical lens 14 overall has a substantially curved configuration. As is well-known per se, the inner optical lens 14 is comprised of an array of lens segments 64. Each lens segment 64 preferably is a Fresnel type, though may be of any other suitable type, and has a substantially flat configuration. Each lens segment 64 has a vertical length greater than its horizontal width. The lens segments 64 are arranged in a contiguous side-by-side relationship. The curved configuration of the inner optical lens 14 is preferred for collecting and focusing heat energy rearwardly thereof, such as on a heat sensor 66, from a wide angle detection pattern and allows for collecting and focusing a significantly greater amount of heat energy on the heat sensor 66 than would be received using the heat sensor 66 alone. The inner optical lens 14 has a pair of opposite substantially straight side edges 68 and a pair of opposite substantially curved end edges 70. Each of the straight opposite lateral side ledges 44 of the interior portions 30 of the middle body structure 20 forming the inner seat 24 receives and supports one of the substantially straight side edges 68 of the inner optical lens 14. Each of the curved opposite end ledges 46 of the interior portions 30 of the middle body structure 20 forming the inner seat 24, in combination with an adjacent one of the opposite end wall interior surfaces 42 of the interior portions 30 forming the inner seat 24, receives and supports one of the substantially curved end edges 70 of the inner optical lens 14.

The outer optical window 16, being sandwiched between the retainer 12 and front cover 18 when assembled, has a substantially flat main portion 72 and a pair of opposite substantially curved side portions 74 which terminate in opposite side edges 75. The flat main portion 72 rests against and contacts the exterior flat surfaces 50, 56 of the exterior portions 32, 34 of the middle body structure 20 and of the side wing structures 22 of the retainer 12. The curved side portions 74 rest against and contact the exterior curved and straight surfaces 58, 60 of the exterior portions 34 of the side wing structures 22 of the retainer 12. The outer optical window 16 also has a peripheral edge 76 and defines a plurality of spaced apart holes 78 adjacent to the peripheral edge 76 thereof. The holes 78 are defined through the substantially flat main portion 72 of the outer optical window 16. Each aperture 62 of the middle body structure 20 and side wing structures 22 of the retainer 12 is aligned with one of the holes 78 of the outer optical window lens 16. The outer optical window 16 has a size substantially similar to the size of the exterior portions 32, 34 of the retainer 12.

The front cover 18 has a substantially U-shaped configuration in transverse cross-section with a substantially flat main bite portion 18a and a pair of curved side walls 18b. The main bite portion 18a of front cover 18 has a plurality of spaced apart couplers 80 in the form of bosses formed thereon and extending rearwardly on opposite longitudinal sides of the window 38 thereof, whereas, a pair of ribs 81 are formed in the inner surface of each of the opposite side walls 18b of cover 18 adjacent to the opposite lateral sides of the window 38. Each aperture 62 of the retainer 12 and hole 78 of the outer optical window 16 has a substantially circular configuration. Each coupler/boss 80 also has a substantially cylindrical configuration conforming to the configurations of the apertures 62 and holes 78 but slightly smaller in diameter than the apertures 62 and holes 78. The couplers/bosses 80 of the front cover 18 align with the apertures 62 of the retainer 12 and the apertures 78 of the outer optical window 16 and the opposite side edges 75 of the outer optical window 16 abut against the ribs 81 on the curved side walls 18b of cover 18 so as to permit the coupling and securing of the front cover 18 with the retainer 12 having the inner optical lens 14 and an outer optical window 16 respectively disposed on the inner and outer seats 24 and 26 of the retainer 12. Further, the front cover 18 is mounted to a back base 82. The back base 82 has a substantially U-shaped configuration in transverse cross-section and combines with the front cover 18 to enclose the dual lens retainer 12, the inner optical lens 14 and outer optical window 16. The back base 82 has the heat sensor 66 mounted thereon such that the heat sensor 66 is positioned centrally in relation to and rearwardly of the inner optical lens 14. The back base 82 may be mounted to any suitable external structure. The front cover 18 has a pair of opposite end walls 84. Each opposite end wall 84 of the front cover 18 defines a plurality of vents 86.

Furthermore, the middle body structure 20 of the combination lens and window retainer 12 has a pair of spaced apart feet or protrusions 88 formed thereon at the opposite lateral sides 28 and rearwardly of the inner seat 24 of the dual lens retainer 12 for contacting a support substrate 90, such as a printed circuit board, and spacing the middle body structure 20 away from the support substrate 90. Each protrusion 88 is disposed closer to one than to the other of the opposite end walls 40 of the middle body structure 20. Each protrusion 86 has a substantially cylindrical configuration and inner and outer portions with two different diameters.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A combination lens and window retainer for a motion detection system, said retainer comprising:
   (a) a middle body structure having opposite lateral sides, interior portions and exterior portions;
   (b) a pair of side wing structures attached to and extending in opposite lateral directions from said opposite lateral sides of said middle body structure, each of said side wing structures having exterior portions;
   (c) an inner seat defined on said interior portions of said middle body structure for receiving and supporting an inner optical lens, said middle body structure and side wing structures together defining an opening aligned with the inner optical lens and providing an unobstructed forward panoramic field of view through said retainer; and
   (d) an outer seat defined forwardly of said inner seat on said exterior portions of said middle body structure and of said side wing structures for supporting an outer optical window in an overlying relationship to the opening of the middle body structure and side wing structures.

2. The retainer as recited in claim 1, wherein said interior portions of said middle body structure have a configuration which substantially conforms to a configuration of the inner optical lens.

3. The retainer as recited in claim 1, wherein:
   said middle body structure also has a pair of opposite end walls;
   said interior portions of said middle body structure include
      a pair of opposite interior surfaces each on one of said opposite end walls of said middle body structure,
      a pair of opposite side ledges each formed on one of said opposite lateral sides of said middle body structure and extending between said opposite end walls thereof and toward the other of said opposite lateral sides thereof, and
      a pair of opposite end ledges each formed on one of said opposite end walls at a forward peripheral edge thereof and extending toward the other of said opposite end walls; and
   said inner seat being formed by said opposite side ledges, opposite end wall interior surfaces and opposite end ledges of said interior portions of said middle body structure.

4. The retainer as recited in claim 3, wherein each of said opposite side ledges of said interior portions forming said inner seat has a substantially straight configuration adapted to receive and support one of a pair of substantially straight side edges of the inner optical lens.

5. The retainer as recited in claim 3, wherein each of said opposite end ledges of said interior portions forming said inner seat has a substantially curved configuration and, in combination with an adjacent one of said opposite end wall interior surfaces of said interior portions forming said inner seat, is adapted to receive and support one of a pair of substantially curved end edges of the inner optical lens.

6. The retainer as recited in claim 1, wherein:
   said middle body structure also has a pair of opposite end walls;
   said exterior portions of said middle body structure include a pair of exterior flat surfaces each formed along a peripheral edge of a respective one of said opposite end walls;
   each of said side wing structures has a pair of opposite end rims and a lateral side rim extending between and connected to said opposite end rims and spaced away from a respective one of said opposite lateral sides of said middle body structure;
   said exterior portions of each of said side wing structures include
      a pair of exterior flat surfaces each formed along one of said opposite end rims and disposed in the same plane as said flat surfaces of said exterior portions formed along said peripheral edges of said opposite end walls of said middle body structure,
      a pair of opposite exterior curved surfaces each formed along one of said opposite end rims and extending from said exterior flat surfaces on said opposite end rims, and
      an exterior straight surface formed along said lateral side rim and extending between said opposite exterior curved surfaces; and
   said outer seat is formed by said exterior flat surfaces of said exterior portions of said middle body structure and of said side wing structures and by said exterior curved and straight surfaces of said exterior portions of said side wing structures.

7. The retainer as recited in claim 6, wherein said middle body structure and side wing structures define a plurality of apertures through said opposite end wall peripheral edges of said middle body structure and said opposite end rims of said side wing structures on opposite sides of said opening therethrough, each of said apertures and aligned holes for receiving one of a plurality of couplers therethrough for coupling the outer optical window to said middle body structure and side wing structures.

8. The retainer as recited in claim 1, wherein each of said opposite lateral sides of said middle body structure has a pair of spaced apart protrusions formed thereon rearwardly of said inner seat for contacting a support substrate and spacing said middle body structure away therefrom.

9. A combination lens and window housing assembly for a motion detection system, said assembly comprising:
   (a) a combination lens and window retainer including
      (i) a middle body structure having opposite lateral sides, interior portions and exterior portions,
      (ii) a pair of side wing structures attached to and extending in opposite lateral directions from said opposite lateral sides of said middle body structure, each of said side wing structures having exterior portions,
      (iii) an inner seat defined on said interior portions of said middle body structure, and
      (iv) an outer seat defined forwardly of said inner seat on said exterior portions of said middle body structure and of said side wing structures;
   (b) an inner optical lens mounted to said inner seat of said retainer, said middle body structure and side wing structures of said retainer together defining an opening aligned with said inner optical lens and providing an unobstructed forward panoramic field of view through said retainer;
   (c) an outer optical window lens mounted to said outer seat of said retainer in an overlying relationship to said opening of said retainer, and
   (d) a front cover housing said retainer, said inner optical lens and said outer optical window and coupled with said outer optical window and said retainer, said front cover defining a window aligned with said outer optical window and said opening of said retainer and providing an unobstructed forward panoramic field of view through said front cover substantially corresponding with said unobstructed forward panoramic field of view through said retainer.

10. The assembly as recited in claim 9, wherein said inner optical lens has a configuration and said middle body structure of said retainer has a configuration which substantially conforms to said configuration of said inner optical lens.

11. The assembly as recited in claim 9, wherein said inner optical lens has a substantially curved configuration.

12. The assembly as recited in claim 9, wherein:
said middle body structure of said retainer also has a pair of opposite end walls;
said interior portions of said middle body structure include
  a pair of opposite interior surfaces each on one of said opposite end walls of said middle body structure,
  a pair of opposite side ledges each formed on one of said opposite lateral sides of said middle body structure and extending between said opposite end walls thereof and toward the other of said opposite lateral sides thereof, and
  a pair of opposite end ledges each formed on one of said opposite end walls at a forward peripheral edge thereof and extending toward the other of said opposite end walls; and
said inner seat of said retainer being formed by said opposite side ledges, opposite end wall interior surfaces and opposite end ledges of said interior portions of said middle body structure of said retainer.

13. The assembly as recited in claim 12, wherein:
said inner optical lens has a pair of opposite substantially straight side edges; and
each of said opposite side ledges of said interior portions forming said inner seat of said retainer has a substantially straight configuration for receiving and supporting one of said straight side edges of said inner optical lens.

14. The assembly as recited in claim 12, wherein:
said inner optical lens has a pair of opposite substantially curved end edges; and
each of said opposite end ledges of said interior portions forming said inner seat of said dual lens retainer has a substantially curved configuration and, in combination with an adjacent one of said opposite end walls interior surfaces of said interior portions forming said inner seat, receives and supports one of said curved end edges of said inner optical lens.

15. The assembly as recited in claim 9, wherein:
said middle body structure of said retainer also has a pair of opposite end walls;
said exterior portions of said middle body structure include a pair of exterior flat surfaces each formed along a peripheral edge of a respective one of said opposite end walls;
each of said side wing structures of said dual lens retainer has a pair of opposite end rims and a lateral side rim extending between and connected to said opposite end rims and spaced away from a respective one of said opposite lateral sides of said middle body structure;
said exterior portions of each said side wing structure include
  a pair of exterior flat surfaces each formed along one of said opposite end rims and disposed in the same plane as said flat surfaces of said exterior portions formed along said peripheral edges of said opposite end walls of said middle body structure,
  a pair of opposite exterior curved surfaces each formed along one of said opposite end rims and extending from said exterior flat surfaces on said opposite end rims, and
  an exterior straight surface formed along said lateral side rim and extending between and said opposite exterior curved surfaces; and
said outer seat is formed by said exterior flat surfaces of said exterior portions of said middle body structure and of said side wing structures and by said exterior curved and straight surfaces of said exterior portions of said side wing structures.

16. The assembly as recited in claim 15, wherein said outer optical window has a substantially flat main portion which contacts said exterior flat surfaces of said exterior portions of said middle body structure and of said side wing structures of said retainer and a pair of opposite substantially curved side portions which contact said exterior curved and straight surfaces of said exterior portions of said side wing structures.

17. The assembly as recite in claim 15, wherein:
said front cover has a plurality of couplers formed thereon and extending rearwardly on opposite sides of said window therethrough;
said outer optical window has a peripheral edge and defines a plurality of holes adjacent to said peripheral edge thereof; and
said middle body structure and side wing structures of said retainer define a plurality of apertures through said opposite end wall peripheral edges of said middle body structure and of said opposite end rims of said side wing structures on opposite sides of said opening therethrough, each of said apertures and aligned holes receiving one of said plurality of couplers therethrough to couple said front cover and outer optical window to said middle body structure and side wing structures of said retainer.

18. The assembly as recited in claim 17, wherein said outer optical window has a substantially flat main portion and said plurality of holes of said outer optical window are defined through said substantially flat main portion thereof.

19. The assembly as recited in claim 9, wherein each of said opposite lateral sides of said middle body structure of said retainer has a pair of spaced apart protrusions formed thereon rearwardly of said inner seat of said retainer for contacting a support substrate and spacing said middle body structure away therefrom.

20. The assembly as recited in claim 9, further comprising:
a back base mounting said front cover; and
a heat sensor mounted on said back base such that said heat sensor is positioned centrally in relation to and rearwardly of said inner optical lens.

* * * * *